(12) United States Patent
Liu

(10) Patent No.: US 11,337,145 B2
(45) Date of Patent: May 17, 2022

(54) METHOD AND DEVICE FOR SEARCHING FOR COMMON RESOURCE SET OF REMAINING MISSION-CRITICAL SYSTEM INFORMATION

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 152 days.

(21) Appl. No.: 16/861,195

(22) Filed: Apr. 28, 2020

(65) Prior Publication Data

US 2020/0260368 A1 Aug. 13, 2020

Related U.S. Application Data

(63) Continuation of application No. PCT/CN2017/109152, filed on Nov. 2, 2017.

(51) Int. Cl.
*H04W 4/00* (2018.01)
*H04W 48/16* (2009.01)
*H04W 72/04* (2009.01)

(52) U.S. Cl.
CPC ......... *H04W 48/16* (2013.01); *H04W 72/046* (2013.01)

(58) Field of Classification Search
CPC ... H04W 48/18; H04W 56/00; H04W 72/042; H04W 72/0453; H04W 72/046; H04W 72/005; H04L 41/0896; H04L 41/0806
See application file for complete search history.

(56) References Cited

U.S. PATENT DOCUMENTS

| | | | |
|---|---|---|---|
| 8,521,164 B2 | 8/2013 | Kwack | |
| 9,432,138 B2 | 8/2016 | Kang | |
| 9,628,140 B2 | 4/2017 | Xie et al. | |
| 2011/0223915 A1 | 9/2011 | Kwack | |
| 2014/0003349 A1 | 1/2014 | Kang | |
| 2014/0003379 A1 | 1/2014 | Kang | |

(Continued)

FOREIGN PATENT DOCUMENTS

| | | |
|---|---|---|
| CN | 102104973 A | 6/2011 |
| CN | 102404689 A | 4/2012 |

(Continued)

OTHER PUBLICATIONS

International Search Report in the international application No. PCT/CN2017/109152, dated Jan. 19, 2018.

(Continued)

*Primary Examiner* — Shantell L Heiber
(74) *Attorney, Agent, or Firm* — Syncoda LLC; Feng Ma

(57) ABSTRACT

A method for searching for a CORESET of RMSI includes: receiving, from a base station, a synchronous signal block (SSB) carrying indication information, wherein the indication information is configured to indicate time domain information of the CORESET of the RMSI corresponding a plurality of SSBs and a number of frequency-domain resource elements occupied by the CORESET of the RMSI; obtaining the indication information by parsing the received SSB; and searching for, according to the indication information, the CORESET of the RMSI in a corresponding time domain and a bandwidth portion corresponding to the received SSB.

18 Claims, 13 Drawing Sheets

(56) References Cited

U.S. PATENT DOCUMENTS

| | | |
|---|---|---|
| 2014/0050165 A1 | 2/2014 | Park |
| 2014/0348077 A1 | 11/2014 | Chen |
| 2015/0016370 A1 | 1/2015 | Takeda et al. |
| 2016/0277065 A1 | 9/2016 | Xie et al. |
| 2017/0064685 A1 | 3/2017 | Rico Alvarino et al. |
| 2017/0222768 A1 | 8/2017 | Lee et al. |
| 2017/0353254 A1 | 12/2017 | Islam et al. |
| 2019/0150121 A1 | 5/2019 | Abdoli |
| 2019/0159180 A1 | 5/2019 | Ly et al. |
| 2019/0230534 A1 | 7/2019 | John Wilson et al. |
| 2020/0119874 A1* | 4/2020 | Liu ................... H04L 5/0048 |
| 2021/0185683 A1 | 6/2021 | Reial et al. |

FOREIGN PATENT DOCUMENTS

| | | |
|---|---|---|
| CN | 102612088 A | 7/2012 |
| CN | 104283581 A | 1/2015 |
| CN | 105612801 A | 5/2016 |
| CN | 106304097 A | 1/2017 |
| CN | 106850165 A | 6/2017 |
| CN | 106851840 A | 6/2017 |
| CN | 107223362 A | 9/2017 |
| KR | 20160005003 A | 1/2016 |
| RU | 2533313 C2 | 11/2014 |
| RU | 2641664 C2 | 1/2018 |
| WO | 2012118269 A2 | 9/2012 |
| WO | 2017180030 A1 | 10/2017 |

OTHER PUBLICATIONS

English translation of the Written Opinion of the International Search Authority in the international application No. PCT/CN2017/109152, dated Jan. 19, 2018.
Vivo, Discussion on Remaining Minimum System Information, 3GPP TSG RAN WG1 Meeting #90bis R1-1717461, Oct. 13, 2017 (Oct. 13, 2017), Section 2-3.
First Office Action of the Chinese application No. 201780001705.7, dated Aug. 28, 2020.
Samsung "Remaining details on remaining minimum system information delivery" 3GPP TSG RAN WG1#90b R1-1717578 Prague, Czech Republic, Oct. 9-13, 2017.
Second Office Action of the Chinese application No. 201780001705.7, dated Feb. 10, 2021.
"3rd Generation Partnership Project; Technical Specification Group Radio Access Network; Study on New Radio (NR) to support Non Terrestrial Networks (Release 15)" 3GPP TR 38.811 V0.1.0 (Jun. 2016), http://www.3gpp.org.
Notice of Allowance of the U.S. Appl. No. 16/763,886, dated Aug. 23, 2021.
Ex Libris Discovery—My Favorites—Search historyhttp://library.uspto.gov/discovery/favorites?vid=OIUSPTO INST:OIUSPTO&lang=en&section=search history,Aug. 14, 2021.
3GPP TSG RAN WG1 Meeting 91 R1-1720581,Nov. 18, 2017, CMCC,"Details on PRB grid offset indication".
3GPP TSG RAN WG1 Meeting 91 R1-1720649,Nov. 18, 2017,Qualcomm Incorporated,"Remaining system information delivery consideration".
First Office Action of the Chinese application No. 201780002122.6, dated May 7, 2021.
International Search Report in the international application No. PCT/CN2017/114024, dated Mar. 28, 2018.
English translation of the Written Opinion of the International Search Authority in the international application No. PCT/CN2017/114024, dated Mar. 28, 2018.
Samsung."Summary of Offline Discussion on RMSI CORESET Configuration"3GPP TSG RAN WG1#91, R1-1721709, Reno USA, Dec. 4, 2017 (Dec. 4, 2017),p. 2, line 1 to p. 10, line 2.
International Search Report in the international application No. PCT/CN2018/074359, dated Nov. 1, 2018.
English translation of the Written Opinion of the International Search Authority in the international application No. PCT/CN2018/074359, dated Nov. 1, 2018.
First Office Action of the Chinese application No. 201880000064.8, dated May 20, 2020.
Intel Corporation"On BWP reconfiguration", Intel Corporation,3GPP TSG-RAN WG4 Meeting#85 R4-1712875.2017.
Intel Corporation, "Details on NR PBCH design", 3GPP TSG RAN WG1 Meeting RAN1 #89 R1-1707339, May 19, 2017 (May 19, 2017), entire document.
Samsung:"NR-PBCH contents and payload size", 3GPP Draft;R1-1713554, Aug. 20, 2017.
Notice of Allowance of of the Russian application No. 202012746507, dated Apr. 22, 2021.
Nokia et al:"Remaining details related to SS blocks",3GPP Draft;R1-1721361,Nov. 27, 2017.
Vivo:"Discussion on Remaining Minimum System Information",3GPP Draft; R1-1717461, Oct. 8, 2017.
Supplementary European Search Report in the European application No. 18902021.7, dated Nov. 2, 2020.
3GPP TSG RAN WG1 NR Ad Hoc Meeting R1-1709973,Huawei"On initial access for wideband carrier",2017.
Second Office Action of the Chinese application No. 201880000064.8, dated Jan. 28, 2021.
Catt,"Offline summary for AI 6.1.2.2 Remaining details on Remaining Minimum System Information",3GPP TSG RAN WG1 R1/1716806,Jan. 25, 2017, 09.
MediaTek Inc.,"Summary of Bandwidth Part Remaining lssues"[online],3GPP TSG RAN WG1 R1/1801067, Jan. 24, 2018, 01.
Samsung,"Remaining details on SS burst set related procedures"[online],3GPP TSG RAN WG1 R1/1715908,Jan. 12, 2017, 09.
First Office Action of the Japanese application No. 2020-560519, dated Oct. 5, 2021.
Office Action of the Indian application No. 202047034482, dated Nov. 17, 2021.
Non-Final Office Action of the U.S. Appl. No. 16/962,573, dated Dec. 9, 2021.

* cited by examiner

METHOD AND DEVICE FOR SEARCHING FOR COMMON RESOURCE SET OF REMAINING MISSION-CRITICAL SYSTEM INFORMATION

CROSS-REFERENCE TO RELATED APPLICATION

The present application is a continuation of International Application No. PCT/CN2017/109152 filed on Nov. 2, 2017, the disclosure of which is hereby incorporated by reference in its entirety.

BACKGROUND

In recent discussion of the 3rd generation partnership project, a conclusion that there may be a plurality of synchronous signal blocks (SSBs) in broadband operation is drawn.

SUMMARY

The disclosure relates to the technical field of communications, and in particular to a method and device for sending indication information, a method and device for searching for a common resource set (CORESET) of remaining system information (RMSI), a base station, user equipment (UE) and a computer-readable storage medium.

According to a first aspect of embodiments of the disclosure, provided is a method for sending indication information, applied to a base station, and the method including: adding the indication information to a physical broadcast channel (PBCH) in a synchronous signal block (SSB), wherein the indication information is configured to indicate time domain information of a common resource set (CORESET) of remaining system information (RMSI) corresponding a plurality of SSBs and a number of a plurality of frequency-domain resource elements occupied by the CORESET of the RMSI; and sending the SSB carrying the indication information to user equipment (UE) through beam sweeping.

According to a second aspect of embodiments of the disclosure, provided is a method for searching for a common resource set (CORESET) of remaining system information (RMSI), applied to user equipment (UE), and the method including: receiving, from a base station, a synchronous signal block (SSB) carrying indication information, wherein the indication information is configured to indicate time domain information of the CORESET of the RMSI corresponding a plurality of SSBs and a number of a plurality of frequency-domain resource elements occupied by the CORESET of the RMSI; obtaining the indication information by parsing the received SSB; and searching for, according to the indication information, the CORESET of the RMSI in a corresponding time domain and a bandwidth portion corresponding to the received SSB, wherein the bandwidth portion denotes a resource unit with a certain bandwidth.

According to a third aspect of embodiments of the disclosure, provided is user equipment, including: a processor, and memory for storing processor-executable instructions, wherein the processor is configured to: receive, from a base station, a synchronous signal block (SSB) carrying indication information, wherein the indication information is configured to indicate time domain information of the CORESET of the RMSI corresponding a plurality of SSBs and a number of a plurality of frequency-domain resource elements occupied by the CORESET of the RMSI; obtain the indication information by parsing the received SSB; and search for, according to the indication information, the CORESET of the RMSI in a corresponding time domain and a bandwidth portion corresponding to the received SSB, wherein the bandwidth portion denotes a resource unit with a certain bandwidth.

It is to be understood that the general description above and detailed description later are merely exemplary and explanatory, and are not intended to restrict the disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
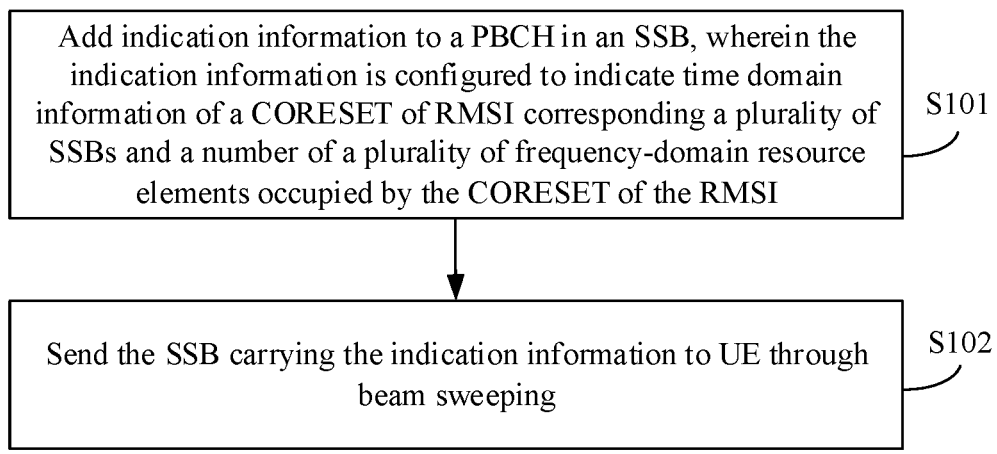
FIG. 1 illustrates a flowchart of a method for sending indication information according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

The plurality of SSBs may correspond to a common resource set (CORESET) of remaining system information (RMSI), and therefore, how to find, from the plurality of SSBs, the CORESET of the corresponding RMSI is a problem. Typically, the CORESET of the RMSI may be indicated by one bit in a physical broadcast channel (PBCH), while the CORESET of the corresponding RMSI is not indicated in some of the SSBs. If the CORESET of the RMSI is not indicated in a found SSB, a new SSB has to be found, and a PBCH in the new SSB has to be parsed out. However, it takes much time to search for the new SSB.

FIG. 1 illustrates a flowchart of a method for sending indication information according to some embodiments of the present disclosure. Description is made from a base station side in the embodiment. As illustrated in FIG. 1, the method for sending indication information includes blocks S101 and S102.

In block S101, indication information is added to a PBCH in an SSB. The indication information is configured to indicate time domain information of a CORESET of RMSI corresponding a plurality of SSBs and a number of a plurality of frequency-domain resource elements occupied by the CORESET of the RMSI.

The frequency-domain resource element occupied by the CORESET of the RMSI may include but is not limited to a physical resource block (PRB) occupied by the CORESET of the RMSI.

In order to specify the number of positions for the CORESET of the RMSI in the frequency domain, to be a limited number, it may be indicated, in the indication information, that the number of PRBs occupied by the CORESET of the RMSI is a limited number. For example, if it is indicated that the number of PRBs occupied by the CORESET of the RMSI is n, e.g., 2, there may be at most 99 positions, in a bandwidth portion containing 100 PRBs, that may be the frequency-domain position of the CORESET of the RMSI.

In addition, it is to be noted that the SSB does not carry 1-bit information for indicating whether the SSB contains a CORESET of RMSI.

In block S102, the SSB carrying the indication information is sent to UE through beam sweeping.

In the embodiment, after indication information is added to a PBCH in an SSB, the SSB carrying the indication information may be sent to UEs through beam sweeping, so as to ensure that the SSB can be received by each of the UEs. After receiving the SSB, the UE can search for the CORESET of the RMSI in a corresponding bandwidth portion according to the indication information in the SSB. If no CORESET of the RMSI is found, the UE can continue to search for the CORESET of the RMSI in a portion of a bandwidth part (BWP) beyond the bandwidth portion, so as to reduce the search time.

In the embodiment above, by adding, to a PBCH in an SSB, indication information for indicating time-domain information of a CORESET of RMSI corresponding to a plurality of SSBs, and a number of a plurality of frequency-domain resource elements occupied by the CORESET of the RMSI, and sending the SSB carrying the indication information to UE through beam sweeping, the UE can find, from the plurality of SSBs, the CORESET of the corresponding RMSI with less time, and does not have to add an indication bit to the PBCH.

Figure 2:
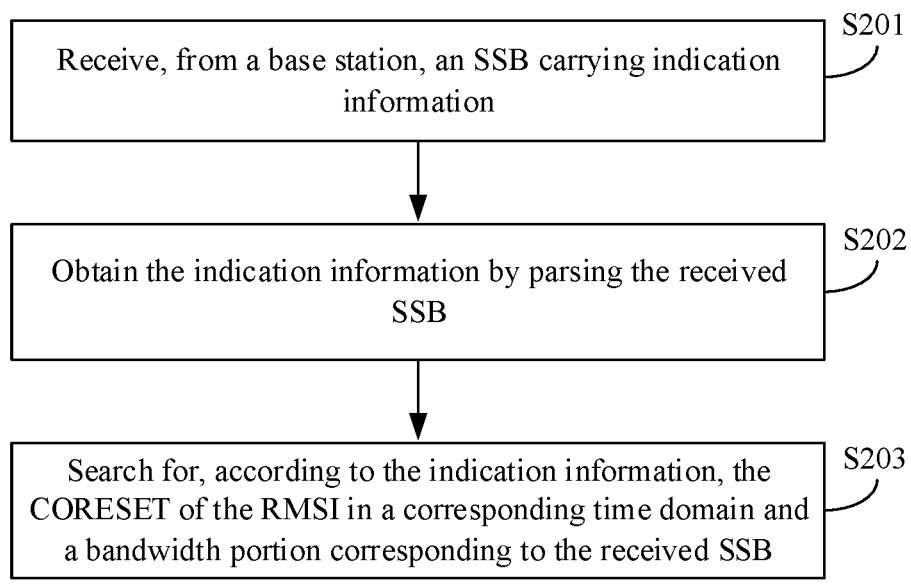
FIG. 2 illustrates a flowchart of a method for searching for a CORESET of RMSI according to some embodiments of the present disclosure.

FIG. 2 illustrates a flowchart of a method for searching for a CORESET of RMSI according to some embodiments of the present disclosure. Description is made from UE side in the embodiment. As illustrated in FIG. 2, the method for searching for a CORESET of RMSI includes blocks S201, S202 and S203.

In block S201, an SSB carrying indication information is received from a base station. The indication information is configured to indicate time-domain information of a CORESET of RMSI corresponding a plurality of SSBs and a number of a plurality of frequency-domain resource elements occupied by the CORESET of the RMSI.

In block S202, the indication information is parsed out from the received SSB.

The UE can obtain the indication information by parsing the SSB after receiving the SSB from the base station.

In block S203, the UE searches for, according to the indication information, the CORESET of the RMSI in a corresponding time domain and a bandwidth portion corresponding to the received SSB. The bandwidth portion denotes a resource unit with a certain bandwidth.

After obtaining the indication information, the UE may search for the CORESET of the RMSI in a corresponding time domain and a bandwidth portion corresponding to the SSB.

In the embodiment, the bandwidth portion is a resource unit with a bandwidth specified by a protocol, and the number of bandwidth portions contained in each frequency band is agreed in the protocol.

In the embodiment above, by receiving, from a base station, an SSB carrying indication information, and searching for, according to the indication information parsed out from the SSB, a CORESET of RMSI in a corresponding time domain and a bandwidth portion corresponding to the received SSB, the CORESET of the corresponding RMSI can be found in a plurality of SSBs with less time, and an indication bit does not have to be added to the PBCH.

Figure 3:
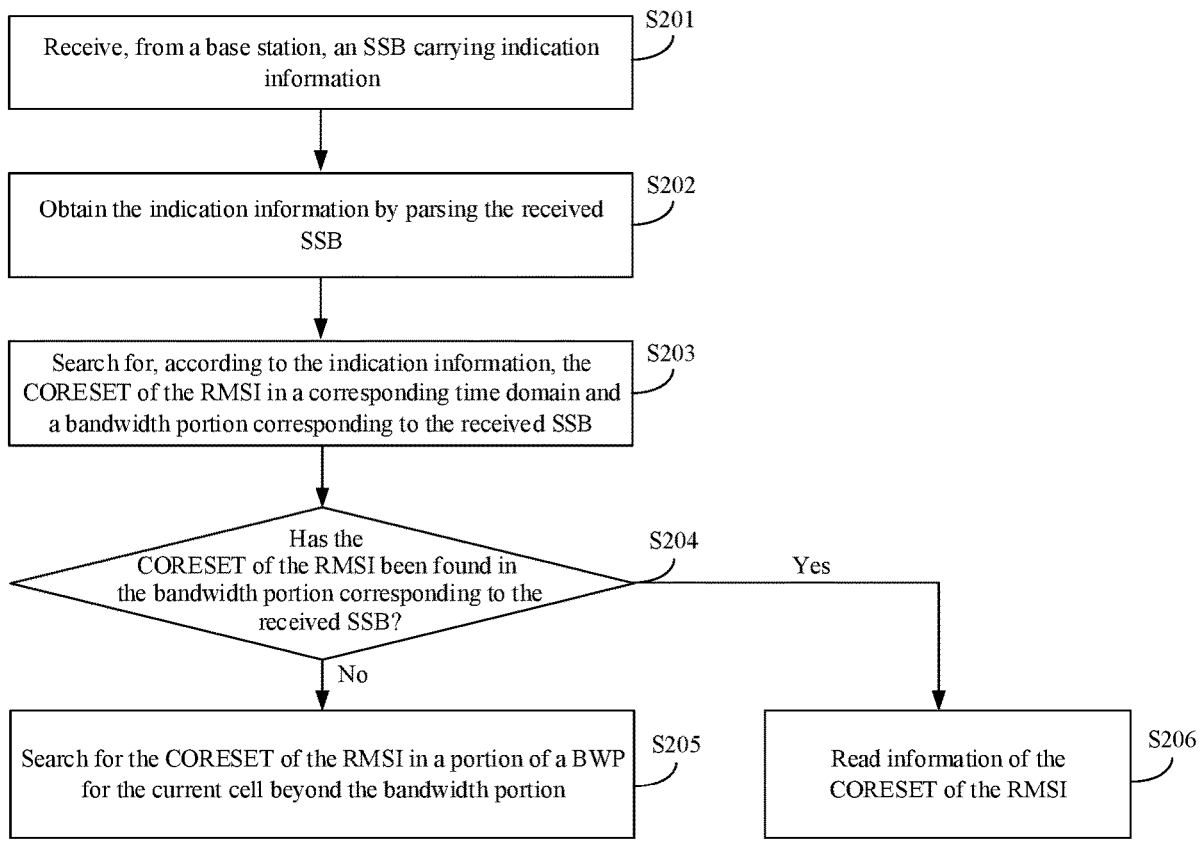
FIG. 3 illustrates a flowchart of another method for searching for a CORESET of RMSI according to some embodiments of the present disclosure.

FIG. 3 illustrates a flowchart of another method for searching for a CORESET of RMSI according to some embodiments of the present disclosure. As illustrated in FIG. 3, the method for searching for a CORESET of RMSI further includes blocks S204, S205 and S206.

In block S204, whether the CORESET of the RMSI is found in the bandwidth portion corresponding to the received SSB is determined. If no CORESET of the RMSI is found, block S205 is performed; and if the CORESET of the RMSI is found, block S206 is performed.

In block S205, the UE searches for the CORESET of the RMSI in a portion of a bandwidth part (BWP) for a current cell beyond the bandwidth portion.

In some embodiments, the bandwidth portion corresponding to the received SSB has a default bandwidth which is smaller than a bandwidth of the BWP.

In the embodiment, when no CORESET of the RMSI has been found in the bandwidth portion corresponding to the received SSB, the UE can search for the CORESET of the RMSI in a portion of a BWP for a current cell beyond the bandwidth portion, instead of searching for the CORESET of the RMSI by finding a new SSB. The time for searching for the CORESET of the RMSI can be reduced significantly.

In the embodiment, preferably, the UE may search for, position by position, the CORESET of the RMSI in the portion of the BWP for the current cell beyond the bandwidth portion.

In block S206, CORESET information of the RMSI is read.

In the embodiment, the UE may read the corresponding information when having found the CORESET of the RMSI in the bandwidth portion corresponding to the received SSB.

In the embodiment above, when no CORESET of the RMSI has been found in a bandwidth portion corresponding to a received SSB, UE can search for the CORESET of the RMSI in a portion of a BWP for a current cell beyond the bandwidth portion, instead of searching for the CORESET of the RMSI by finding a new SSB. The time for searching for the CORESET of the RMSI can be reduced significantly.

Figure 4:
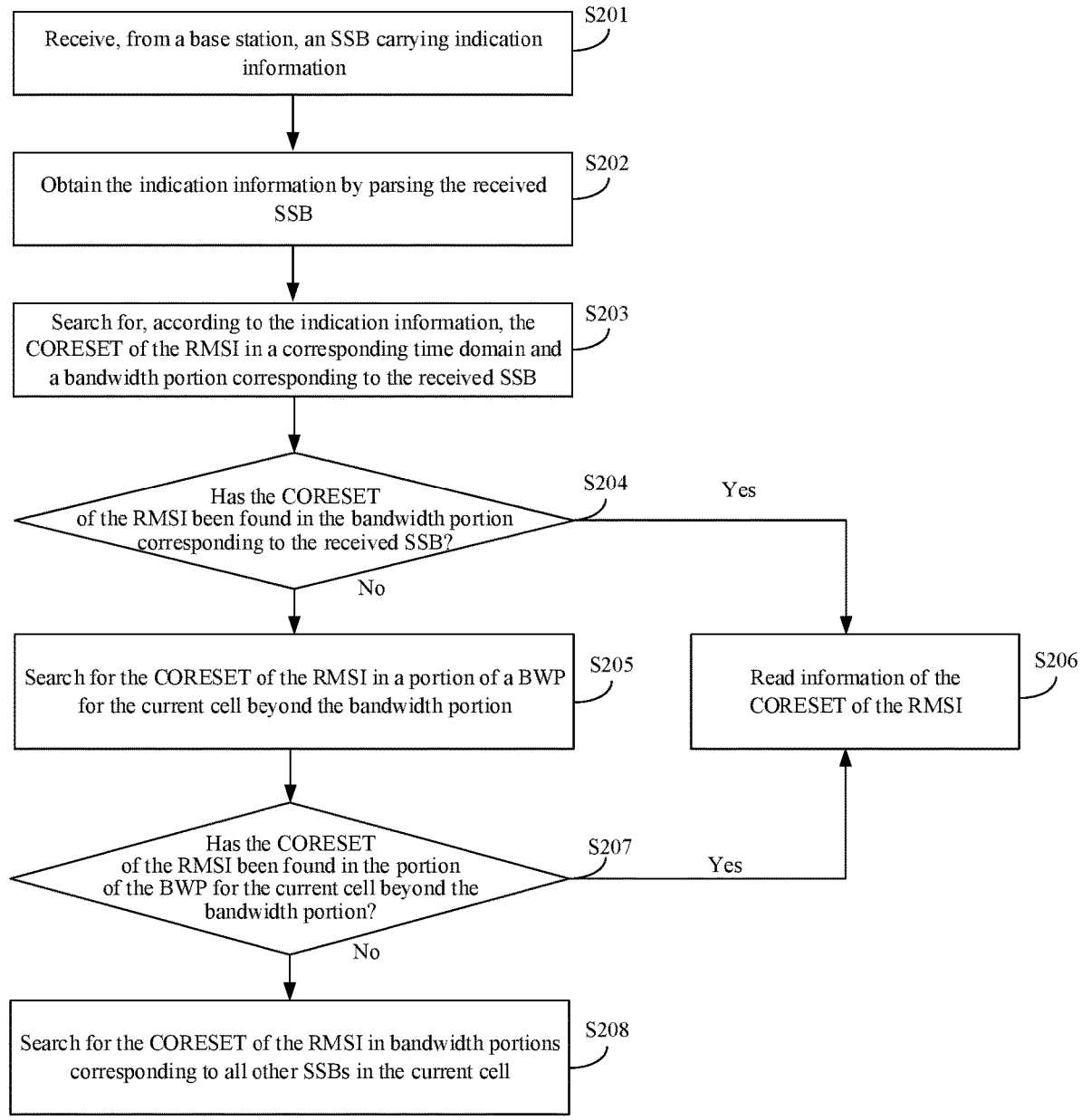
FIG. 4 illustrates a flowchart of another method for searching for a CORESET of RMSI according to some embodiments of the present disclosure.

FIG. 4 illustrates a flowchart of another method for searching for a CORESET of RMSI according to some embodiments of the present disclosure. As illustrated in FIG. 4, the method for searching for a CORESET of RMSI further includes blocks S207 and S208.

In block S207, whether the CORESET of the RMSI is found in the portion of the BWP for the current cell beyond the bandwidth portion is determined. If no CORESET of the RMSI is found, block S208 is performed; and if the CORESET of the RMSI is found, block S206 is performed.

In block S208, the UE searches for the CORESET of the RMSI in bandwidth portions corresponding to all other SSBs in the current cell.

In the embodiment, when no CORESET of the RMSI is found in a portion of a BWP for a current cell beyond the bandwidth portion, the UE can search for the CORESET of the RMSI in bandwidth portions corresponding to all other SSBs in the current cell, so as to find the CORESET of the RMSI.

In the embodiment above, when no CORESET of the RMSI is found in a portion of a BWP for a current cell beyond the bandwidth portion, the UE searches for the CORESET of the RMSI in bandwidth portions corresponding to all other SSBs in the current cell, so as to find the CORESET of the RMSI.

Figure 5:
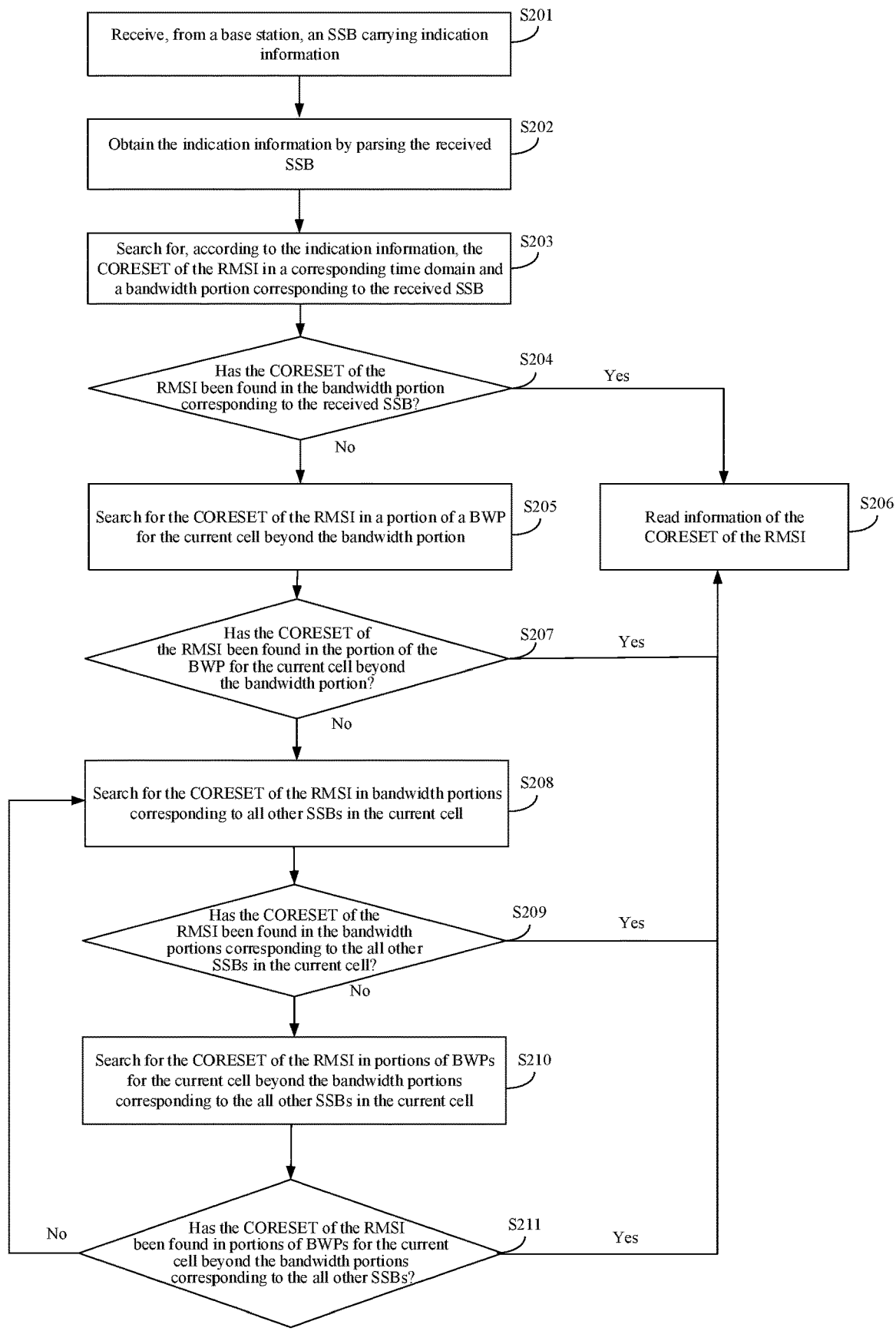
FIG. 5 illustrates a flowchart of another method for searching for a CORESET of RMSI according to some embodiments of the present disclosure.

FIG. 5 illustrates a flowchart of another method for searching for a CORESET of RMSI according to some embodiments of the present disclosure. As illustrated in FIG. 5, the method for searching for a CORESET of RMSI further includes blocks S209 and S210.

In block S209, whether the CORESET of the RMSI is found in the bandwidth portions corresponding to the all other SSBs in the current cell is determined. If no CORESET of the RMSI is found, block S210 is performed; and if the CORESET of the RMSI is found, block S206 is performed.

In block S210, the UE searches for the CORESET of the RMSI in portions of BWPs for the current cell beyond the bandwidth portions corresponding to the all other SSBs.

In the embodiment, preferably, the UE may search for, position by position, the CORESET of the RMSI in portions of BWPs for the current cell beyond the bandwidth portions corresponding to the all other SSBs.

In block S211, whether the CORESET of the RMSI is found in the portions of BWPs for the current cell beyond the bandwidth portions corresponding to the all other SSBs is determined. If no CORESET of the RMSI is found, the UE continues to perform block S208; and if the CORESET of the RMSI is found, the UE performs block S206.

In the embodiment, when no CORESET of the RMSI is found in bandwidth portions corresponding to all other SSBs in the current cell, the UE can search for the CORESET of the RMSI in portions of BWPs for the current cell beyond the bandwidth portions corresponding to the all other SSBs. If still no CORESET of the RMSI is found, the UE can continue to search for the CORESET of the RMSI in all BWPs for the current cell, until the CORESET of the RMSI is found.

In the embodiment above, when no CORESET of the RMSI is found in bandwidth portions corresponding to all other SSBs in the current cell, the UE searches for the CORESET of the RMSI in portions of BWPs for the current cell beyond the bandwidth portions corresponding to the all other SSBs. If still no CORESET of the RMSI is found, the UE searches for the CORESET of the RMSI in all BWPs for the current cell, until the CORESET of the RMSI is found. In this way, the CORESET of the RMSI can be found.

In an example, there may be four bandwidth parts (BWPs) for the current cell, i.e., a first BWP, a second BWP, a third BWP and a fourth BWP. Each of the BWPs includes a bandwidth portion.

The bandwidth portion corresponding to the received SSB refers to a default bandwidth in a first BWP among the four BWPs. The default bandwidth may be such as 20 M in the first BWP. The portion of the BWP for the current cell beyond the bandwidth portion may be the remaining part in the first BWP beyond the default bandwidth, and may be wider than the default bandwidth.

In the example, the bandwidth portions corresponding to the all other SSBs are default bandwidths of the other BWPs among the four BWPs other than the first BWP, i.e., the second, third, and fourth BWPs. These default bandwidths may also be such as 20 M.

In the example, the continuing to search for the CORESET of the RMSI in all BWPs for the current cell means searching for the CORESET of the RMSI in all of the first, second, third and fourth BWPs for the current cell.

Figure 6:
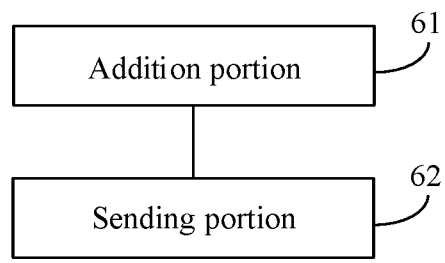
FIG. 6 illustrates a block diagram of a device for sending indication information according to some embodiments of the present disclosure.

FIG. 6 illustrates a block diagram of a device for sending indication information according to some embodiments of the present disclosure. The device for sending indication information may be located in a base station. As illustrated in FIG. 6, the device includes an addition portion 61 and a sending portion 62.

The addition portion 61 is configured to add the indication information to a physical broadcast channel (PBCH) in a synchronous signal block (SSB). The indication information is configured to indicate time domain information of a common resource set (CORESET) of remaining system information (RMSI) corresponding a plurality of SSBs and a number of a plurality of frequency-domain resource elements occupied by the CORESET of the RMSI.

The frequency-domain resource element occupied by the CORESET of the RMSI may include but is not limited to a physical resource block (PRB) occupied by the CORESET of the RMSI.

In order to specify the number of positions for the CORESET of the RMSI in the frequency domain, to be a limited number, it can be indicated, in the indication information, that the number of PRBs occupied by the CORESET of the RMSI is a limited number. For example, if it is indicated that the number of PRBs occupied by the CORESET of the RMSI is n, e.g., 2, there may be at most 99 positions, in a bandwidth portion containing 100 PRBs, that may be the frequency-domain position for the CORESET of the RMSI.

In addition, it is to be noted that the SSB does not carry 1-bit information for indicating whether the SSB contains a CORESET of RMSI.

The sending portion 62 is configured to send, to user equipment (UE) through beam sweeping, the SSB carrying the indication information added by the addition portion 61.

In the embodiment, after indication information is added to a PBCH in an SSB, the SSB carrying the indication information may be sent to UEs through beam sweeping, so as to ensure that the SSB can be received by each of the UEs. After receiving the SSB, the UE can search for the CORESET of the RMSI in a corresponding bandwidth portion according to the indication information in the SSB. If no CORESET of the RMSI is found, the UE can continue to search for the CORESET of the RMSI in a portion of a bandwidth part (BWP) beyond the bandwidth portion, so as to reduce the search time.

In the embodiment, by adding, to a PBCH in an SSB, indication information for indicating time-domain information of a CORESET of RMSI corresponding to a plurality of SSBs, and a number of a plurality of frequency-domain resource elements occupied by the CORESET of the RMSI, and sending the SSB carrying the indication information to UE through beam sweeping, the UE can find the CORESET of the corresponding RMSI from the plurality of SSBs with less time, and does not have to add an indication bit to the PBCH.

Figure 7:
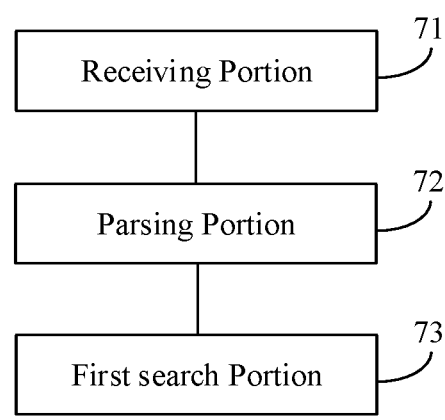
FIG. 7 illustrates a block diagram of a device for searching for a CORESET of RMSI according to some embodiments of the present disclosure.

FIG. 7 illustrates a block diagram of a device for searching for a CORESET of RMSI according to some embodiments of the present disclosure. The device may be located in UE. As illustrated in FIG. 7, the device includes a receiving portion 71, a parsing portion 72 and a first search portion 73.

The receiving portion 71 is configured to receive, from a base station, a synchronous signal block (SSB) carrying indication information. The indication information is configured to indicate time domain information of the CORESET of the RMSI corresponding a plurality of SSBs and a number of a plurality of frequency-domain resource elements occupied by the CORESET of the RMSI.

The parsing portion 72 is configured to obtain the indication information by parsing the SSB received by the receiving portion.

The UE can obtain the indication information by parsing the SSB after receiving the SSB from the base station.

The first search portion 73 is configured to search for, according to the indication information parsed out by the parsing portion, the CORESET of the RMSI in a corresponding time domain and a bandwidth portion corresponding to the received SSB. The bandwidth portion denotes a resource unit with a certain bandwidth.

After obtaining the indication information, the UE may search for, according to the indication information, the CORESET of the RMSI in a corresponding time domain and a bandwidth portion corresponding to the SSB.

In the embodiment, the bandwidth portion is a resource unit with a bandwidth specified by a protocol, and the number of bandwidth portions contained in each frequency band is agreed in the protocol.

In the embodiment, by receiving, from a base station, an SSB carrying indication information, and searching for, according to the indication information parsed out from the SSB, a CORESET of RMSI in a corresponding time domain and a bandwidth portion corresponding to the received SSB, the CORESET of the corresponding RMSI can be found in a plurality of SSBs with less time, and an indication bit does not have to be added to the PBCH.

Figure 8:
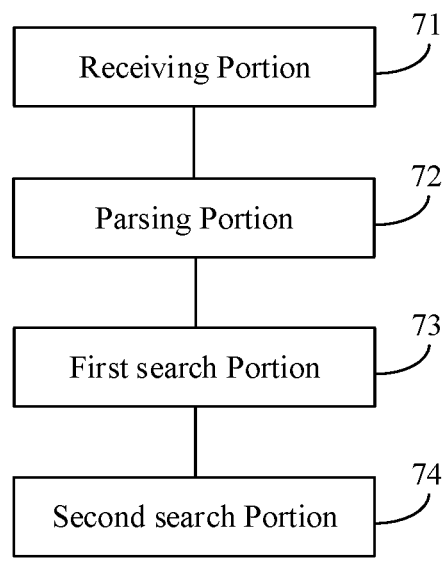
FIG. 8 illustrates a block diagram of another device for searching for a CORESET of RMSI according to some embodiments of the present disclosure.

FIG. 8 illustrates a block diagram of another device for searching for a CORESET of RMSI according to some embodiments of the present disclosure. As illustrated in FIG. 8, based on the embodiment according to FIG. 7, the device further includes a second search portion 74.

The second search portion 74 is configured to: in response to no CORESET of the RMSI being found in the bandwidth portion corresponding to the SSB received by the receiving portion, search for the CORESET of the RMSI in a portion of a bandwidth part (BWP) for a current cell beyond the bandwidth portion.

In the embodiment, when no CORESET of the RMSI has been found in the bandwidth portion corresponding to the received SSB, the UE can search for the CORESET of the RMSI in a portion of a BWP for a current cell beyond the bandwidth portion, instead of searching for the CORESET of the RMSI by finding a new SSB. The time for searching for the CORESET of the RMSI can be reduced significantly.

In some embodiments, the bandwidth portion corresponding to the received SSB has a default bandwidth which is smaller than a bandwidth of the BWP.

In the embodiment, preferably, the UE can search for, position by position, the CORESET of the RMSI in the portion of the BWP for the current cell beyond the bandwidth portion.

In the embodiment above, when no CORESET of the RMSI has been found in a bandwidth portion corresponding to a received SSB, UE can search for the CORESET of the RMSI in a portion of a BWP for a current cell beyond the bandwidth portion, instead of searching for the CORESET of the RMSI by finding a new SSB. The time for searching for the CORESET of the RMSI can be reduced significantly.

Figure 9:
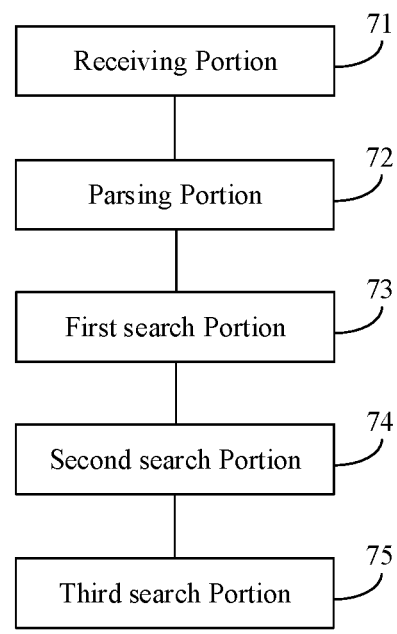
FIG. 9 illustrates a block diagram of another device for searching for a CORESET of RMSI according to some embodiments of the present disclosure.

FIG. 9 illustrates a block diagram of another device for searching for a CORESET of RMSI according to some embodiments of the present disclosure. As illustrated in FIG. 9, based on the embodiment according to FIG. 8, the device further includes a third search portion 75.

The third search portion 75 is configured to: in response to no CORESET of the RMSI being found by the second search portion 74 in the portion of the bandwidth part (BWP) for the current cell beyond the bandwidth portion, search for the CORESET of the RMSI in bandwidth portions corresponding to all other SSBs in the current cell.

In the embodiment, when no CORESET of the RMSI is found in a portion of a BWP for a current cell beyond the bandwidth portion, the CORESET of the RMSI may be searched for in bandwidth portions corresponding to all other SSBs in the current cell, so as to find the CORESET of the RMSI.

In the embodiment above, when no CORESET of the RMSI is found in a portion of a BWP for a current cell beyond the bandwidth portion, the UE searches for the CORESET of the RMSI in bandwidth portions corresponding to all other SSBs in the current cell, so as to find the CORESET of the RMSI.

Figure 10:
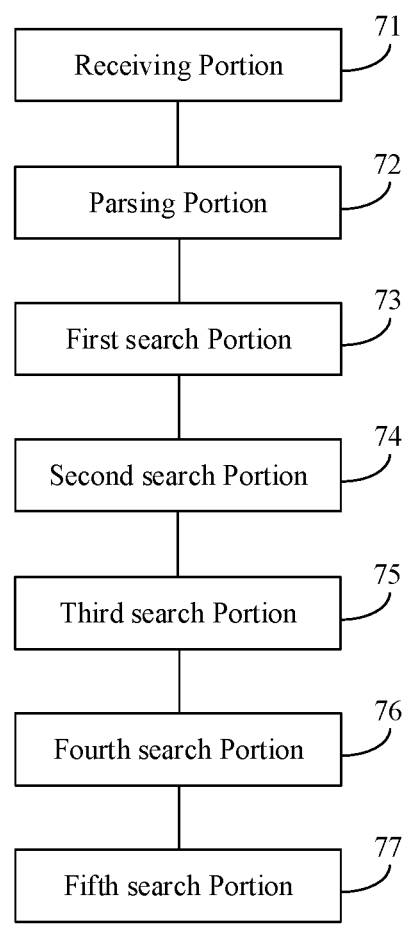
FIG. 10 illustrates a block diagram of another device for searching for a CORESET of RMSI according to some embodiments of the present disclosure.

FIG. 10 illustrates a block diagram of another device for searching for a CORESET of RMSI according to some embodiments of the present disclosure. As illustrated in FIG. 10, based on the embodiment according to FIG. 9, the device further includes a fourth search portion 76 and a fifth search portion 77.

The fourth search portion 76 is configured to: in response to no CORESET of the RMSI being found by the third search portion in the bandwidth portions corresponding to the all other SSBs in the current cell, search for the CORESET of the RMSI in portions of BWPs for the current cell beyond the bandwidth portions corresponding to the all other SSBs.

In the embodiment, preferably, the UE may search for, position by position, the CORESET of the RMSI in portions of BWPs for the current cell beyond the bandwidth portions corresponding to the all other SSBs.

The fifth search portion 77 is configured to: in response to no CORESET of the RMSI being found by the fourth search portion in portions of BWPs for the current cell beyond the bandwidth portions corresponding to the all other SSBs, continue to search for the CORESET of the RMSI in all BWPs for the current cell, until the CORESET of the RMSI is found.

In the embodiment, when no CORESET of the RMSI is found in bandwidth portions corresponding to all other SSBs in the current cell, the UE may search for the CORESET of the RMSI in portions of BWPs for the current cell beyond the bandwidth portions corresponding to the all other SSBs. If still no CORESET of the RMSI is found, the UE can continue to search for the CORESET of the RMSI in all BWPs for the current cell, until the CORESET of the RMSI is found.

In the embodiment above, when no CORESET of the RMSI is found in bandwidth portions corresponding to all other SSBs in the current cell, the UE searches for the CORESET of the RMSI in portions of BWPs for the current cell beyond the bandwidth portions corresponding to the all other SSBs. if still no CORESET of the RMSI is found, the UE searches for the CORESET of the RMSI in all BWPs for the current cell, until the CORESET of the RMSI is found. In this way, the CORESET of the RMSI can be found.

Figure 11:
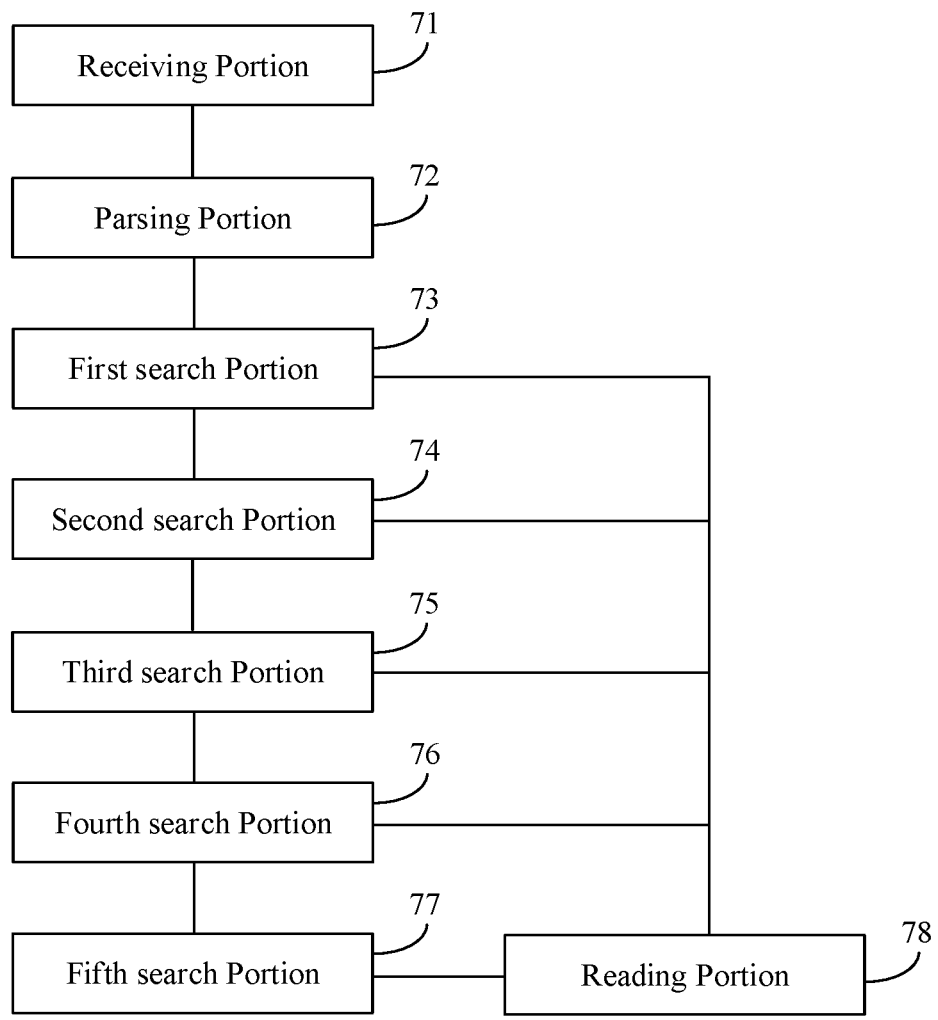
FIG. 11 illustrates a block diagram of another device for searching for a CORESET of RMSI according to some embodiments of the present disclosure.

FIG. 11 illustrates a block diagram of another device for searching for a CORESET of RMSI according to some embodiments of the present disclosure. As illustrated in FIG. 11, based on the embodiment according to FIG. 7, FIG. 8, FIG. 9 or FIG. 10, the device further includes a reading portion 78.

The reading portion 78 is configured to: read CORESET information of the RMSI, in response to one of the first search portion 73, the second search portion 74, the third search portion 75, the fourth search portion 76 or a fifth search portion 77 having found the CORESET of the RMSI.

In the embodiment, the reading portion 78 can read the corresponding information when the CORESET of the RMSI has been found in the bandwidth portion corresponding to the received SSB.

In the embodiment above, the CORESET information of the RMSI is read when the CORESET of the RMSI is found in the bandwidth portion corresponding to the received SSB. The purpose of reading the CORESET of the RMSI is achieved.

Figure 12:
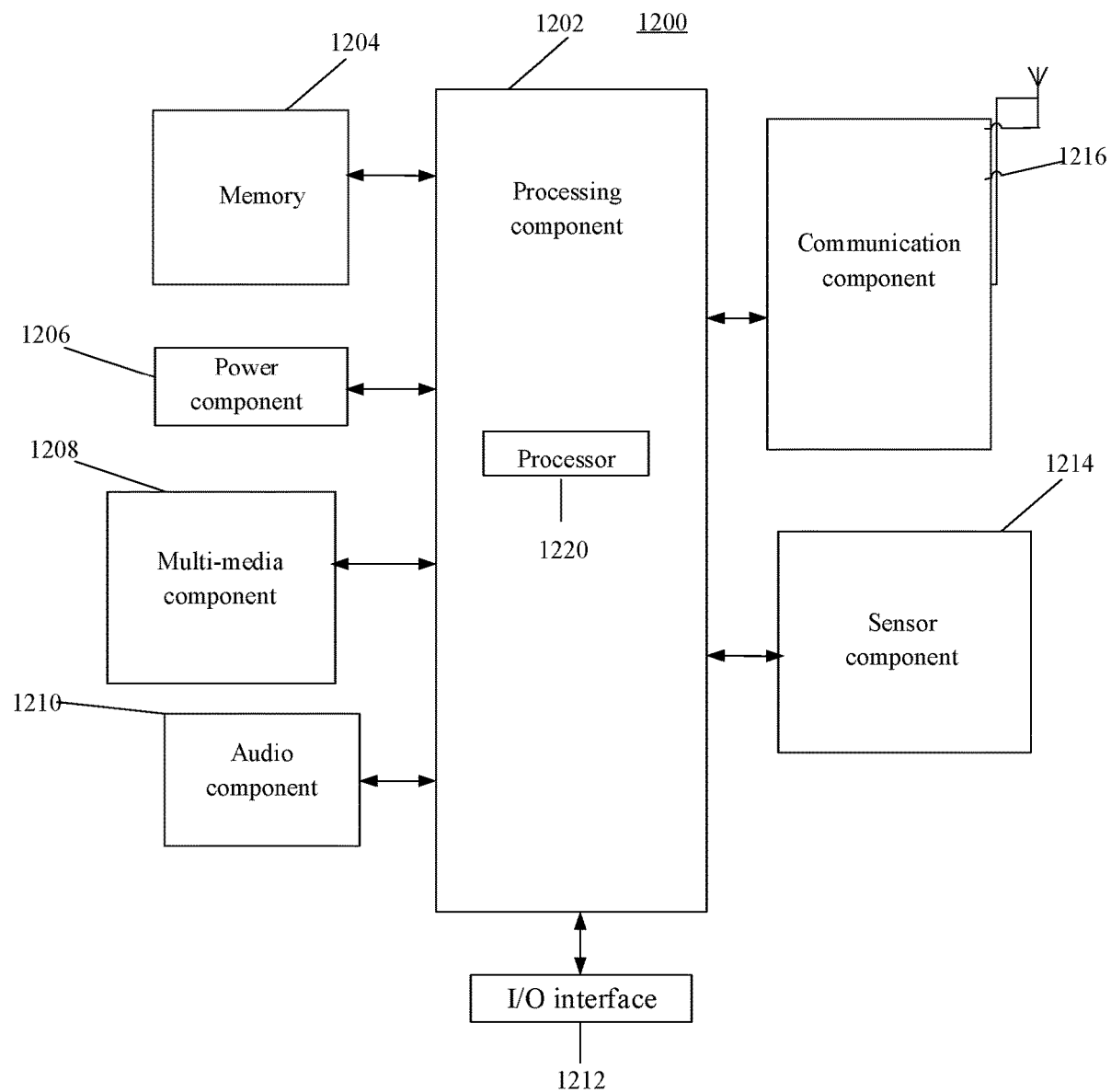
FIG. 12 illustrates a block diagram of a device applicable for searching for a CORESET of RMSI according to some embodiments of the present disclosure.

FIG. 12 illustrates a block diagram of a device applicable for searching for a CORESET of RMSI according to some embodiments of the present disclosure. For example, the device 1200 may be user equipment, such as a mobile phone, a computer, a digital broadcast terminal, a message transceiving device, a game console, a tablet device, medical equipment, fitness equipment and a personal digital assistant.

As illustrated in FIG. 12, the device 1200 may include one or more of the following: a processing component 1202, memory 1204, a power component 1206, a multi-media component 1208, an audio component 1210, an input/output (I/O) interface 1212, a sensor component 1214, and a communication component 1216.

The processing component 1202 generally controls the overall operation of the device 1200, such as operations associated with display, a phone call, data communication, a camera operation and a recording operation. The processing component 1202 may include one or more processors 1220 to execute instructions, so as to complete all or some blocks in the methods above. In addition, the processing component 1202 may include one or more modules for the interaction between the processing component 1202 and the other components. For example, the processing component 1202 may include a multi-media module for interaction between the multi-media component 1208 and the processing component 1202.

One processor 1220 of the processing component 1202 may be configured to: receive, from a base station, an SSB carrying indication information. The indication information is configured to indicate time-domain information of a CORESET of RMSI corresponding a plurality of SSBs and a number of a plurality of frequency-domain resource elements occupied by the CORESET of the RMSI.

The processor is further configured to obtain the indication information by parsing the received SSB.

The processor is further configured to search for, according to the indication information, the CORESET of the RMSI in a corresponding time domain and a bandwidth portion corresponding to the received SSB. The bandwidth portion denotes a resource unit with a certain bandwidth.

The memory 1204 is configured to store various types of data, so as to support operations at the device 1200. The examples of these types of data include instructions of any application or method for operating on the device 1200, contact person data, phone book data, messages, pictures, video, etc. The memory 1204 may be implemented by any type of volatile or non-volatile storage device or a combination of both, for example, an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1206 supplies power for the various components of the device 1200. The power component 1206 may include a power management system, one or more power sources, and other components associated with the generation, management and distribution of power for the device 1200.

The multi-media component 1208 includes a screen serving as an output interface between the device 1200 and a user. In some embodiments, the screen may include a liquid crystal display (LCD) and a touch pad (TP). In some embodiments, organic light-emitting diode (OLED) or other types of displays can be employed. If the screen includes a touch pad, then the screen may be implemented as a touch screen so as to receive an input signal from the user. The touch pad includes one or more touch sensors to sense touch, slide and gestures on the touch pad. The touch sensor may not only sense the boundaries of touch or slide actions, but also can detect the duration and pressure related to the touch or slide operations. In some embodiments, the multi-media component 1208 includes a front camera and/or a rear camera. When the device 1200 is in an operating mode, such as a photography mode or a video mode, the front camera and/or the rear camera may receive external multi-media data. Each front camera and rear camera may be a fixed optical lens system or have a focal length or optical zoom capability.

The audio component 1210 is configured to output and/or input an audio signal. For example, the audio component 1210 includes a microphone (MIC), and when the device 1200 is in an operating mode, such as a calling mode, a recording mode and a voice recognition mode, the microphone is configured to receive an external audio signal. The received audio signal can be further stored in the memory 1204 or sent via the communication component 1216. In some embodiments, the audio component 1210 further includes a loudspeaker for outputting an audio signal.

The I/O interface 1212 provides an interface between the processing component 1202 and a peripheral interface module, and the above peripheral interface module may be a keyboard, a click wheel, a button, etc. The button may include but is not limited to a home page button, a volume button, a start button and a locking button.

The sensor component 1214 includes one or more sensors for providing state evaluation for the device 1200 from various aspects. For example, the sensor component 1214 may detect an on/off state of the device 1200, and the relative positioning between components; for example, the components are a display and keyboard of the device 1200. The sensor component 1214 may also detect a positional change of the device 1200 or a component of the device 1200, whether there is contact between a user and the battery charging apparatus 1200, the orientation or acceleration/deceleration of the device 1200, and a temperature change of the device 1200. The sensor component 1214 may include a proximity sensor configured to detect the existence of an object nearby without any physical contact. The sensor component 1214 may also include an optical sensor, such as a CMOS or CCD image sensor, for use in an imaging application. In some embodiments, the sensor component 1214 may also include an acceleration sensor, a gyroscope sensor, a magnetic sensor, a pressure sensor or a temperature sensor.

The communication component 1216 is configured for wired or wireless communication between the device 1200 and another device. The device 1200 may access a communication standard based wireless network, such as Wi-Fi, 2G, 3G, 4G, 5G or a combination thereof. In some embodiments of the present disclosure, the communication component 1216 receives a broadcast signal from an external broadcast management system or broadcasts relevant information through a broadcast channel. In some embodiments of the present disclosure, the communication component 1216 further includes a near-field communication (NFC) module for short-range communication. For example, the NFC module may be implemented based on the radio-frequency identification (RFID) technique, the infrared data association (IrDA) technique, the ultra-wide band (UWB) technique, the bluetooth (BT) technique or others.

In some embodiments of the present disclosure, the device 1200 may be implemented by one or more application-specific integrated circuit (ASIC), a digital signal processor (DSP), a digital signal processing device (DSPD), a programmable logic device (PLD), a field programmable gate array (FPGA), a controller, a micro-controller, a microprocessor or other electronic elements, for executing the above methods.

In some embodiments of the present disclosure, a non-transitory computer-readable storage medium including instructions is also provided, for example, memory 1204 including instructions. The above instructions may be executed by the processor 1220 of the device 1200 to complete the above methods. For example, the non-transitory computer-readable storage medium may be a ROM, a CD-ROM, a magnetic tape, a floppy disk, an optical data storage device and so on.

Figure 13:
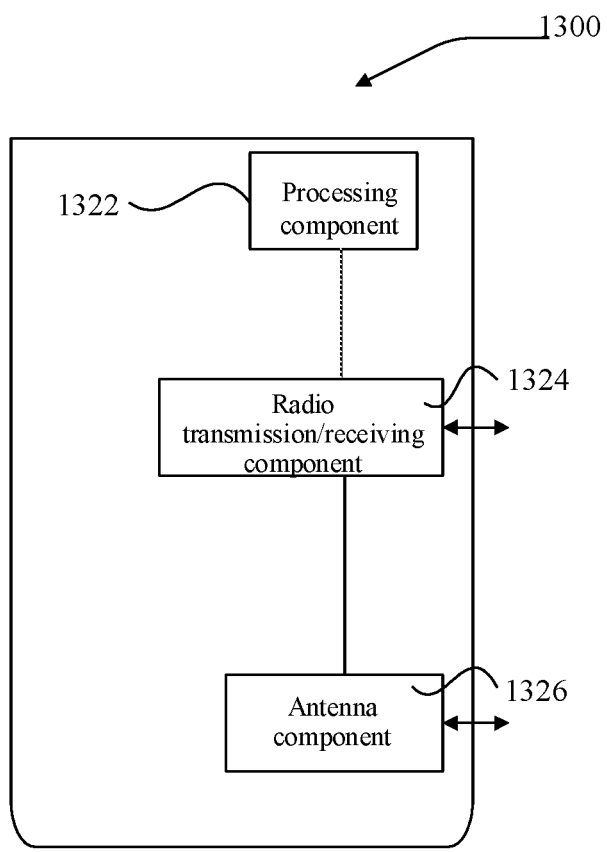
FIG. 13 illustrates a block diagram of a device applicable for sending indication information according to some embodiments of the present disclosure.

FIG. 13 illustrates a block diagram of a device for sending indication information according to some embodiments of the present disclosure. The device 1300 may be provided as a base station. As illustrated in FIG. 13, the device 1300 includes a processing component 1322, a radio transmission/receiving component 1324, an antenna component 1326, and a signal processing part specific to a wireless interface. The processing component 1322 may further include one or more processors.

One processor of the processing component 1322 may be configured to: add the indication information to a physical broadcast channel (PBCH) in a synchronous signal block (SSB). The indication information is configured to indicate time domain information of a common resource set (CORESET) of remaining system information (RMSI) corresponding a plurality of SSBs and a number of a plurality of frequency-domain resource elements occupied by the CORESET of the RMSI.

The processor is further configured to send the SSB carrying the indication information to user equipment (UE) through beam sweeping.

In some embodiments of the present disclosure, a non-transitory computer-readable storage medium including instructions is also provided. The instructions may be executed by the processing component 1322 of the device 1300 to complete the method for sending indication information. For example, the non-transitory computer-readable storage medium may be a ROM, a CD-ROM, a magnetic tape, a floppy disk, an optical data storage device and so on.

Various embodiments of the disclosure can have one or more of the following advantages.

By adding, to a PBCH in an SSB, indication information for indicating time-domain information of a CORESET of RMSI corresponding to a plurality of SSBs, and a number of a plurality of frequency-domain resource elements occupied by the CORESET of the RMSI, and sending the SSB carrying the indication information to user equipment (UE) through beam sweeping, the UE can find the CORESET of the corresponding RMSI from the plurality of SSBs with less time, and an indication bit does not have to be added to the PBCH.

By receiving, from a base station, the SSB carrying the indication information, and searching for, according to the indication information parsed out from the SSB, the CORESET of the RMSI in a corresponding time domain and a bandwidth portion corresponding to the received SSB, the CORESET of the corresponding RMSI can be found from the plurality of SSBs with less time, and an indication bit does not have to be added to the PBCH.

The device embodiments substantially correspond to the method embodiments, and thus for related parts, reference can be made to part of descriptions of the method embodiments. The device embodiment described above is only schematic, units described as separate parts therein may or may not be physically separated, and parts displayed as units may or may not be physical units, and namely may be located in the same place or may also be distributed to multiple network units. Some or all of the portions may be selected according to a practical requirement to achieve the purpose of the solution of the present disclosure.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for sending indication information, applied to a base station, and the method comprising:
    adding the indication information to a physical broadcast channel (PBCH) in a synchronous signal block (SSB), wherein the indication information is configured to indicate time domain information of a common resource set (CORESET) of remaining system information (RMSI) corresponding a plurality of SSBs and a number of a plurality of frequency-domain resource elements occupied by the CORESET of the RMSI; and sending the SSB carrying the indication information to user equipment (UE) through beam sweeping, to enable the UE to: search for, according to the indication information, the CORESET of the RMSI in a corresponding time domain and a bandwidth portion corresponding to the received SSB, wherein the bandwidth portion denotes a resource unit with a certain bandwidth; and in response to no CORESET of the RMSI being found in the bandwidth portion corresponding to the received SSB, search for the CORESET of the RMSI in a portion of a bandwidth part (BWP) for a current cell beyond the bandwidth portion.

2. A method for searching for a common resource set (CORESET) of remaining system information (RMSI), applied to user equipment (UE), and the method comprising:

receiving, from a base station, a synchronous signal block (SSB) carrying indication information, wherein the indication information is configured to indicate time domain information of the CORESET of the RMSI corresponding a plurality of SSBs and a number of a plurality of frequency-domain resource elements occupied by the CORESET of the RMSI;

obtaining the indication information by parsing the received SSB;

searching for, according to the indication information, the CORESET of the RMSI in a corresponding time domain and a bandwidth portion corresponding to the received SSB, wherein the bandwidth portion denotes a resource unit with a certain bandwidth; and in response to no CORESET of the RMSI being found in the bandwidth portion corresponding to the received SSB, searching for the CORESET of the RMSI in a portion of a bandwidth part (BWP) for a current cell beyond the bandwidth portion.

3. The method according to claim 2, wherein:
the bandwidth portion corresponding to the received SSB has a default bandwidth which is smaller than a bandwidth of the BWP.

4. The method according to claim 3, further comprising:
in response to no CORESET of the RMSI being found in the portion of the bandwidth part (BWP) for the current cell beyond the bandwidth portion, searching for the CORESET of the RMSI in bandwidth portions corresponding to all other SSBs in the current cell.

5. The method according to claim 4, further comprising:
in response to no CORESET of the RMSI being found in the bandwidth portions corresponding to the all other SSBs in the current cell, searching for the CORESET of the RMSI in portions of BWPs for the current cell beyond the bandwidth portions corresponding to the all other SSBs; and in response to no CORESET of the RMSI being found in the portions of BWPs for the current cell beyond the bandwidth portions corresponding to the all other SSBs, continuing to search for the CORESET of the RMSI in all BWPs for the current cell, until the CORESET of the RMSI is found.

6. The method according to claim 2, further comprising:
in response to that the CORESET of the RMSI is found, reading information of the CORESET of the RMSI.

7. A communication system implementing the method according to claim 2, comprising a base station and UE, wherein the base station is configured to:

add indication information to a physical broadcast channel (PBCH) in a synchronous signal block (SSB), wherein the indication information is configured to indicate time domain information of a common resource set (CORESET) of remaining system information (RMSI) corresponding a plurality of SSBs and a number of a plurality of frequency-domain resource elements occupied by the CORESET of the RMSI; and send the SSB carrying the indication information to the UE through beam sweeping.

8. The communication system according to claim 7, wherein the UE is configured to:

receive, from the base station, the SSB carrying the indication information;

obtain the indication information by parsing the received SSB; and search for, according to the indication information, the CORESET of the RMSI in a corresponding time domain and a bandwidth portion corresponding to the received SSB, wherein the bandwidth portion denotes a resource unit with a certain bandwidth.

9. The communication system according to claim 8, wherein the UE is further configured to:

in response to no CORESET of the RMSI being found in the bandwidth portion corresponding to the received SSB, search for the CORESET of the RMSI in a portion of a bandwidth part (BWP) for a current cell beyond the bandwidth portion.

10. The communication system according to claim 9, wherein:

the bandwidth portion corresponding to the received SSB has a default bandwidth which is smaller than a bandwidth of the BWP.

11. The communication system according to claim 10, wherein the UE is further configured to:

in response to no CORESET of the RMSI being found in the portion of the bandwidth part (BWP) for the current cell beyond the bandwidth portion, searching for the CORESET of the RMSI in bandwidth portions corresponding to all other SSBs in the current cell.

12. The communication system according to claim 11, wherein the UE is further configured to:

in response to no CORESET of the RMSI being found in the bandwidth portions corresponding to the all other SSBs in the current cell, search for the CORESET of the RMSI in portions of BWPs for the current cell beyond the bandwidth portions corresponding to the all other SSBs; and in response to no CORESET of the RMSI being found in the portions of BWPs for the current cell beyond the bandwidth portions corresponding to the all other SSBs, continue to search for the CORESET of the RMSI in all BWPs for the current cell, until the CORESET of the RMSI is found.

13. The communication system according to claim 7, wherein the UE is further configured to:

in response to that the CORESET of the RMSI is found, read information of the CORESET of the RMSI.

14. User equipment (UE), comprising:
a processor, and
memory stored with processor-executable instructions, wherein the processor is configured to:

receive, from a base station, a synchronous signal block (SSB) carrying indication information, wherein the indication information is used for indicating time-domain information of a CORESET of RMSI corresponding a plurality of SSBs and a number of a plurality of frequency-domain resource elements occupied by the CORESET of the RMSI;

obtain the indication information by parsing the received SSB;

search for, according to the indication information, the CORESET of the RMSI in a corresponding time domain and a bandwidth portion corresponding to the received SSB, wherein the bandwidth portion denotes a resource unit with a certain bandwidth; and in response to no CORESET of the RMSI being found in the bandwidth portion corresponding to the received SSB, search for the CORESET of the RMSI in a portion of a bandwidth part (BWP) for a current cell beyond the bandwidth portion.

15. The UE according to claim 14, wherein:

the bandwidth portion corresponding to the received SSB has a default bandwidth which is smaller than a bandwidth of the BWP.

16. The UE according to claim 15, wherein the processor is further configured to:

in response to no CORESET of the RMSI being found in the portion of the bandwidth part (BWP) for the current cell beyond the bandwidth portion, search for the CORESET of the RMSI in bandwidth portions corresponding to all other SSBs in the current cell.

17. The UE according to claim 16, wherein the processor is further configured to:

in response to no CORESET of the RMSI being found in the bandwidth portions corresponding to the all other SSBs in the current cell, search for the CORESET of the RMSI in portions of BWPs for the current cell beyond the bandwidth portions corresponding to the all other SSBs; and in response to no CORESET of the RMSI being found in the portions of BWPs for the current cell beyond the bandwidth portions corresponding to the all other SSBs, continue to search for the CORESET of the RMSI in all BWPs for the current cell, until the CORESET of the RMSI is found.

18. The UE according to claim 14, wherein the processor is further configured to:

in response to that the CORESET of the RMSI is found, read information of the CORESET of the RMSI.

* * * * *